(12) United States Patent
Proctor et al.

(10) Patent No.: US 9,292,601 B2
(45) Date of Patent: Mar. 22, 2016

(54) DETERMINING A PURPOSE OF A DOCUMENT

(75) Inventors: Larry Lee Proctor, Coppell, TX (US); Hovey Raymond Strong, Jr., San Jose, CA (US); Renjie Tang, San Jose, CA (US); Ruoyi Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2511 days.

(21) Appl. No.: 11/971,673

(22) Filed: Jan. 9, 2008

(65) Prior Publication Data

US 2009/0177963 A1    Jul. 9, 2009

(51) Int. Cl.
*G06F 3/00* (2006.01)
*G06F 17/30* (2006.01)

(52) U.S. Cl.
CPC .................. *G06F 17/30719* (2013.01)

(58) Field of Classification Search
CPC ............................................... G06F 17/300719
USPC .................... 715/254, 234, 243, 255
See application file for complete search history.

(56) References Cited

U.S. PATENT DOCUMENTS

| | | | |
|---|---|---|---|
| 5,185,813 A * | 2/1993 | Tsujimoto | 382/180 |
| 5,689,716 A * | 11/1997 | Chen | 715/256 |
| 5,708,825 A * | 1/1998 | Sotomayor | 715/205 |
| 5,754,840 A | 5/1998 | Rivette et al. | |
| 5,778,361 A * | 7/1998 | Nanjo et al. | |
| 5,778,397 A * | 7/1998 | Kupiec et al. | 715/243 |
| 5,918,236 A * | 6/1999 | Wical | 715/209 |
| 6,038,561 A | 3/2000 | Snyder et al. | |
| 6,556,992 B1 | 4/2003 | Barney et al. | |
| 6,694,331 B2 | 2/2004 | Lee | |
| 6,907,380 B2 | 6/2005 | Mishra et al. | |
| 7,092,872 B2 * | 8/2006 | Polanyi et al. | 704/9 |
| 7,117,437 B2 * | 10/2006 | Chen et al. | 715/254 |
| 7,188,069 B2 | 3/2007 | Hagelin | |
| 7,392,474 B2 * | 6/2008 | Chen et al. | 715/254 |

(Continued)

FOREIGN PATENT DOCUMENTS

EP    1191459    3/2002

OTHER PUBLICATIONS

Ji et al., "Domain-independent Text Segementation Using Anistropic Diffusion and Dynamic Programming," 2003, pp. 322-329.*

(Continued)

*Primary Examiner* — Kyle Stork
(74) *Attorney, Agent, or Firm* — Daniel E. Johnson; Ryan, Mason & Lewis, LLP (57) ABSTRACT

A method of summarizing a document includes a step of extracting one or more sections of the document. The method also includes a step of separating at least one of the one or more extracted sections into one or more subsections based at least in part on a conjunctive structure of the section, wherein each subsection comprises one or more terms. The method also includes steps of determining whether one or more terms within a designated set of terms are present within at least one of the one or more subsections and, responsive to a determination that one or more terms within the designated set of terms are present within at least one of the one or more subsections, removing the one or more terms from the one or more subsections. The method also includes a step of aggregating at least a portion of the one or more sections into a summary of the document.

21 Claims, 4 Drawing Sheets

(56) References Cited

U.S. PATENT DOCUMENTS

| | | | |
|---|---|---|---|
| 7,509,572 B1 * | 3/2009 | Melander et al. | 715/234 |
| 7,627,590 B2 * | 12/2009 | Boguraev et al. | |
| 2004/0158559 A1 | 8/2004 | Poltorak | |
| 2005/0131882 A1 | 6/2005 | Beretich, Jr. et al. | |
| 2005/0165736 A1 | 7/2005 | Oosta | |
| 2005/0210009 A1 | 9/2005 | Tran | |
| 2006/0294099 A1 | 12/2006 | Tsukamoto | |
| 2008/0104506 A1 * | 5/2008 | Farzindar | 715/254 |
| 2008/0147638 A1 * | 6/2008 | Hoeber et al. | 707/5 |

OTHER PUBLICATIONS

McDonald et al., "Flexible Text Segmentation with Structured Multilabel Classification," 2005, pp. 987-994.*

Tseng et al., "Text Mining Techniques for Patent Analysis," 2006, pp. 1216-1247.*

Richmond et al., "Detecting Subject Boundaries Within Text: A Language Independent Statistical Approach," pp. 47-54.*

Richmond et al., "Detecting Subject Boundaries Within Text: A Language Independent Statisitical Approach," 1997, pp. 47-54.*

B. Yoon et al., "Development of New Technology Forecasting Algorithm: Hybrid Approach for Morphology Analysis and Conjoint Analysis of Patent Information," IEEE Transactions on Engineering Management, Aug. 2007, pp. 588-599, vol. 54, No. 3.

C. Kim et al., "A Taxonomical Classification of Business Models on Mobile Business: Patent Analysis and SOM Mapping," IEEE International Conference on Management of Innovation and Technology, Jun. 2006, pp. 478-482.

S. Lee et al., "Using Patent Information for New Product Development: Keyword-Based Technology Roadmapping Approach," PICMET, Jul. 2006, pp. 1496-1502.

A.J.C. Trappey et al., "Automated Patent Document Summarization for R&D Intellectual Property Management," IEEE Proceedings of the 10th International Conference on Computer Supported Cooperative Work in Design, May 2006, 6 pages.

R. Strong et al., "Signpost Generation in Strategic Technology Forecasting," May 2007, 16th International Conference on Management of Technology, 20 pages and 13 slides.

* cited by examiner

DETERMINING A PURPOSE OF A DOCUMENT

FIELD OF THE INVENTION

The present invention relates generally to summarizing a document, and more particularly relates to determining a purpose feature of a document.

BACKGROUND OF THE INVENTION

It is often useful to perform a trend analysis on one or more documents within a given domain in order to discover current trends and challenges within that domain. For example, one may wish to partition a collection of documents into a taxonomy, or a set of mutually disjoint classes of documents. For example, one could use a method called intuitive clustering that breaks out classes corresponding to the most frequently occurring key terms in order and then rebalances the clusters with k-means clustering.

After constructing a taxonomy, one could examine the most typical and least typical examples in each class and/or perform a qualitative trend analysis of each class relative to the trend of the domain. One could also construct a landscape graph that represents a trend analysis of named classes of similar documents.

However, this classification of documents for trend analysis depends on at least one similarity measure. A typical similarity measure is distance in a vector space in which the dimensions correspond to vocabulary terms and projection on a dimension corresponds to the number of occurrences in the document. However, ambiguity of term usage makes this a poor measure of similarity. More specifically, due to various ambiguities, one must edit a taxonomy generated by a random seed process or intuitive clustering process or build it up laboriously, one class at a time, based on detailed knowledge of subject matter experts. Randomization removes robustness (the repeatability of results). Ad hoc editing to remove ambiguity also removes robustness. Moreover, robustness is also removed by the ad hoc building of classes from subject matter expertise because each expert is likely to classify slightly differently from each other expert.

For example, some of the terms used for determining the classes may represent stylistic choices rather than meaningful technical distinctions, thus resulting in style-based, rather than content-based clustering. Even when each key term used is technical, the distinctions may be a hodgepodge of unrelated criteria presenting a confusing final trend analysis to the user.

Thus, current classifications tend to be based on a hodgepodge of unrelated criteria because they are based on the ambiguous occurrence of vocabulary terms. As such, it is difficult to extract robust useful features that provide classification based on consistent (unambiguous) term usage.

As a specific example, the structured information in patent documents provides a number of useful features: assignee, issued patent versus patent application, United States Patent and Trademark Office (USPTO) classification, etc. However, the USPTO classification is, itself, more of a hodgepodge than an optimal classification based on a small dimension. It also depends on user selection with little apparent consistency of such selections among closely related patents.

In addition to the need for a consistent, repeatable classification based on unambiguous usage or small dimension, at least in the patent domain, it is often preferable to obtain classifications based on the purpose of the invention as opposed to the technical details of the method steps (i.e., the means). Although one may also use a classification based on the means; it is often desirable to avoid mixing purpose and means in one classification.

For example, one patent document might describe the use of Complementary Metal Oxide Semiconductor (CMOS) technology to produce an image sensor. Another patent document (with a very different purpose) might describe the use of an image sensor in an inventive process for CMOS device manufacturing. In the former case, the image sensor is the purpose; in the latter case, the image sensor is a means. Likewise, the phrases "provide an image sensor in a manufacturing process" and "provide a new solar cell" both contain the term "provide," but only the latter instance indicates the purpose of the invention.

Thus, there exists a need for extracting from a document a feature of unambiguous usage, which may serve as a summary of the document. In particular, for patent document trend analysis, it would be highly desirable to be able to extract a feature that represents the purpose of the invention as opposed to the means of achieving that purpose.

SUMMARY OF THE INVENTION

Principles of the invention provide techniques for effectively determining a purpose feature of a document.

For example, in an aspect of the invention, a method of summarizing a document includes a step of extracting one or more sections of the document. The method also includes a step of separating at least one of the one or more extracted sections into one or more subsections based at least in part on a conjunctive structure of the section, wherein each subsection comprises one or more terms. The method also includes steps of determining whether one or more terms within a designated set of terms are present within at least one of the one or more subsections and, responsive to a determination that one or more terms within the designated set of terms are present within at least one of the one or more subsections, removing the one or more terms from the one or more subsections. The method also includes a step of aggregating at least a portion of the one or more sections into a summary of the document.

The step of removing one or more terms within a designated set of terms found within at least one of the one or more subsections may include removing a portion of the subsection following a term within a given subset of the designated set of terms.

The step of separating at least one of the one or more extracted sections into one or more subsections may include determining whether a conjunction is present within a given section. Responsive to a determination that a conjunction is present within the given section, the given section may be separated into one or more subsections wherein each subsection represents a portion of the section terminated by at least one of a conjunction and a punctuation mark.

Advantageously, principles of the present invention, in an illustrative embodiment, provide for extraction from a document of a robust useful feature that permits classification based on consistent, unambiguous term usage. For patent document trend analysis, this is the feature that ideally represents the purpose of an invention as opposed to the means of achieving that purpose.

These and other objects, features and advantages of the present invention will become apparent from the following detailed description of illustrative embodiments thereof, which is to be read in connection with the accompanying drawings.

DETAILED DESCRIPTION OF THE INVENTION

It should be understood that although the present invention is described herein primarily as applied to determining a purpose feature of a patent document, inventive techniques may be applicable to generating a summary of one or more documents within any number of fields. A document may comprise any text including, without limitation, one or more portions of a larger text. A feature may include, without limitation, any function of terms within a document or any aspect of a document according to which it might be classified or summarized. A term may comprise any unit of text, including one or more words or one or more portions of a word.

Figure 1:
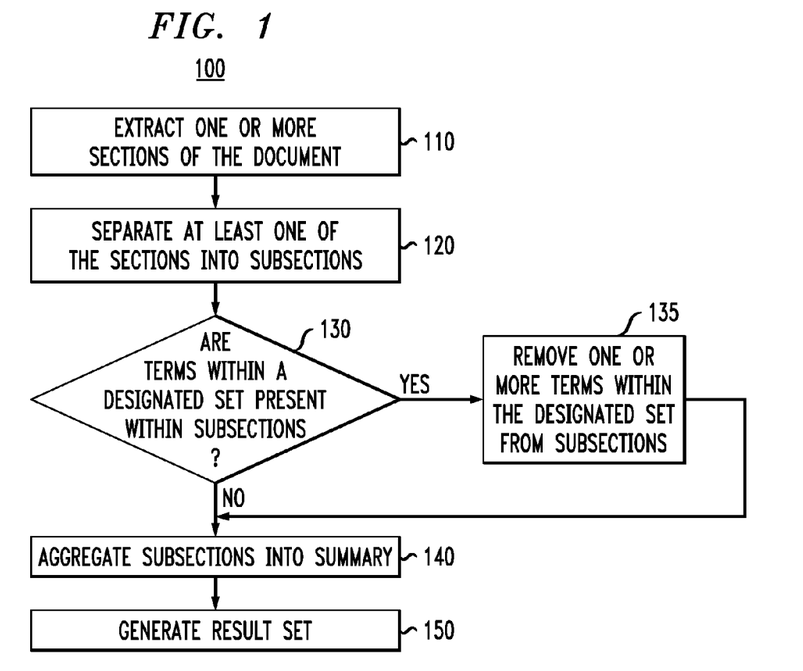
FIG. 1 is a flowchart showing an exemplary method incorporating inventive techniques to summarize a document.

FIG. 1 is a flowchart showing an exemplary method 100 incorporating inventive techniques. The method 100 begins in step 110 with the extraction of one or more sections of at least one document. Each section may comprise, for example, titles, headings, or some portion of the text of the at least one document. More generally, a section may comprise any fragment of a document. For example, in an exemplary embodiment in which the document is a patent document, a section may comprise, for example, the title of the patent document or the first sentence of the abstract of the patent document.

In step 120, at least one of the sections is separated into subsections based at least in part on a conjunctive structure of the section. In a preferred embodiment, this comprises determining whether at least one conjunction is present within a given section. If at least one conjunction is present within a section, the section is separated into one or more subsections wherein each subsection represents a portion of the section terminated by at least one of a conjunction (including, for example, "and," "or," etc.) and a punctuation mark (including, for example, a comma, a semicolon, a period, etc.). These subsections may represent, for example, parts of a fragment. In a simplified embodiment where "and" is the only conjunction and comma is the only punctuation mark, this second part may be expressed by the following Backus-Naur Form, where <cpart> indicates a conjunctive part (e.g., a part which contains "and"):

```
<cpart> ::= <part>,<cpart>
<cpart> ::= <part>, and <part>
<cpart> ::= <part> and <part>
```

In step 130, at least one of the subsections generated in step 120 is parsed into its constituent terms in order to determine whether any terms (in any form) within a designated set of "stop-words" are present. If no "stop-words" are present in any subsections, the process continues directly to step 140, described below. If one or more "stop-words" are present in a subsection, the process continues to step 135, in which any terms within the designated set of "stop-words" may be removed from any subsection in which such a term appears. Alternatively or additionally, for a subset of the aforementioned designated set of "stop-words," referred to as "end-words," any terms within a subsection which follow the end-word are removed as well.

In a preferred embodiment in which the document is a patent document, for example, these "end-words" may include: comprise, include, have, has, and possess. The set of "stop-words" may further include: structure, means, method, way, disclose, provide, demonstrate, show, describe, detail, reveal, teach, form, fabricate, manufacture, construct, build, assemble, compose, mix, dissolve, grow, produce, what, claim, and same. Alternatively or additionally, the set of "stop-words" and/or the set of "end-words" may include at least a portion of the stopwords used by the USPTO Patent Full Text Database, a list of which is appended hereto as Table 1, found at the end of the specification.

In step 140, at least a portion of the subsections is aggregated so as to form a feature or other summary of the document. This aggregation may be as simple as concatenating the subsections together. As discussed below with regard to other illustrative embodiments, however, more complex aggregation functions may be used additionally or alternatively in order to improve the yield of terms with the desired usage.

In step 150, a result set may be generated. This result set comprises the terms present in the summary and, for each term present in the summary, a total number of presences (occurrences) of that term in the document. This result set may be particularly suitable for subsequent generation of a vector space in which the dimensions correspond to vocabulary terms and projection on a dimension corresponds to the number of occurrences in the document, in that the result set for each document within the set of documents may be represented as an element of the vector space.

Figure 2:
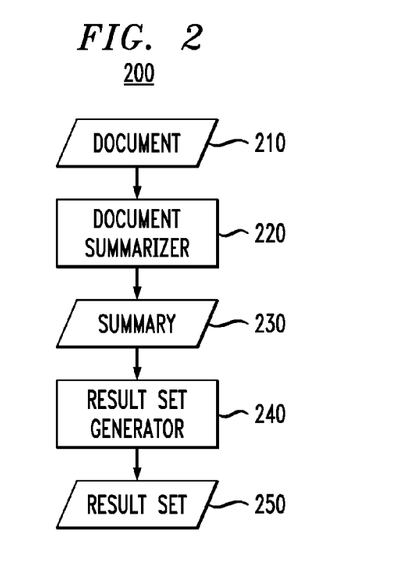
FIG. 2 is a block diagram depicting an exemplary system incorporating inventive techniques to summarize a document.

FIG. 2 is a block diagram depicting an exemplary system 210 incorporating inventive techniques to summarize a document. Document 210 is processed by document summarizer 220 to produce a summary 230. Summary 230 may be a feature, such as a purpose feature. Document summarizer may include, for example, method 100 described above with reference to FIG. 1. Optionally, this summary 230 may then be processed by result set generator 240 to produce result set 250. It should be noted that document summarizer 220 and result set generator 240 may be implemented using hardware, software, or any combination thereof. Moreover, document summarizer 220 and result set generator 240 may comprise a single component or multiple components, or may themselves be portions of one or more components.

Figure 3:
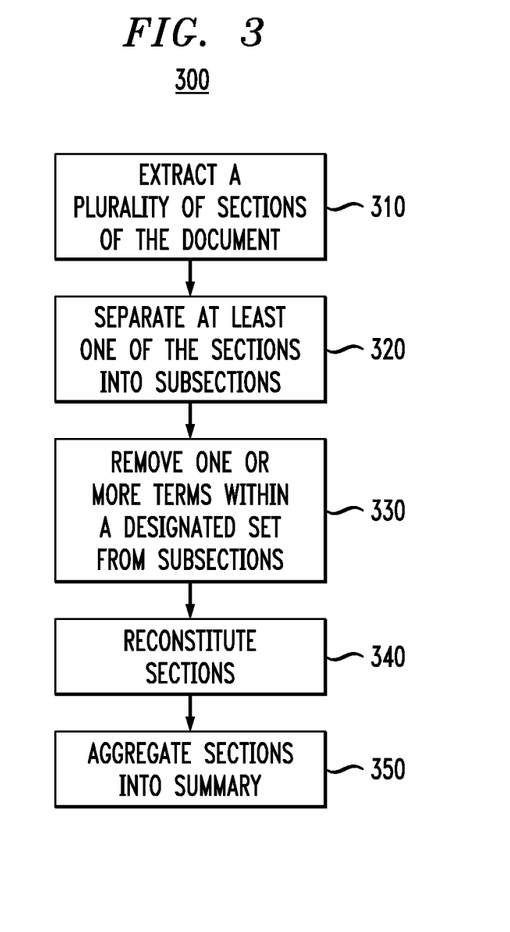
FIG. 3 is a flowchart showing another exemplary method incorporating inventive techniques to summarize a document.

FIG. 3 is a flowchart showing another exemplary method 300 incorporating inventive techniques. The method 300 begins in step 310 with the extraction of a plurality of sections of at least one document. For example, in an exemplary embodiment in which the document is a patent document, these sections may comprise at least a portion of the title of the patent document, at least a portion of the abstract of the patent document, and at least a portion of the claims of the patent document, such as a preamble of at least one independent claim.

In step 320, at least one of the sections is separated into subsections based at least in part on a conjunctive structure of the section in the manner discussed above in reference to step 120 in FIG. 1. In step 330, it is determined whether one or more terms within a designated set are present within and such terms may be removed from at least a portion of the subsections generated in step 320 in the manner discussed above in reference to steps 130 and 135 in FIG. 1.

In step 340, at least one of the sections is reconstituted by concatenating or otherwise aggregating at least a portion of the subsections into which that section was previously separated. In step 350, at least a portion of the sections is aggregated so as to form a feature or other summary of the document. This aggregation may be as simple as concatenating the sections together or a more complex aggregation function may be used. For example, a "voting" function may be used wherein only terms present in a plurality of the sections are aggregated. In other words, terms present in only a single section are excluded from the summary. It should be noted that alternative embodiments may be used, such as one where only terms present in each of the plurality of sections are aggregated or one where only terms present in a specific fraction (such as a majority) of the sections are aggregated. Alternative embodiments may also include weighted voting schemes with different weight assigned to different sections.

Figure 4:
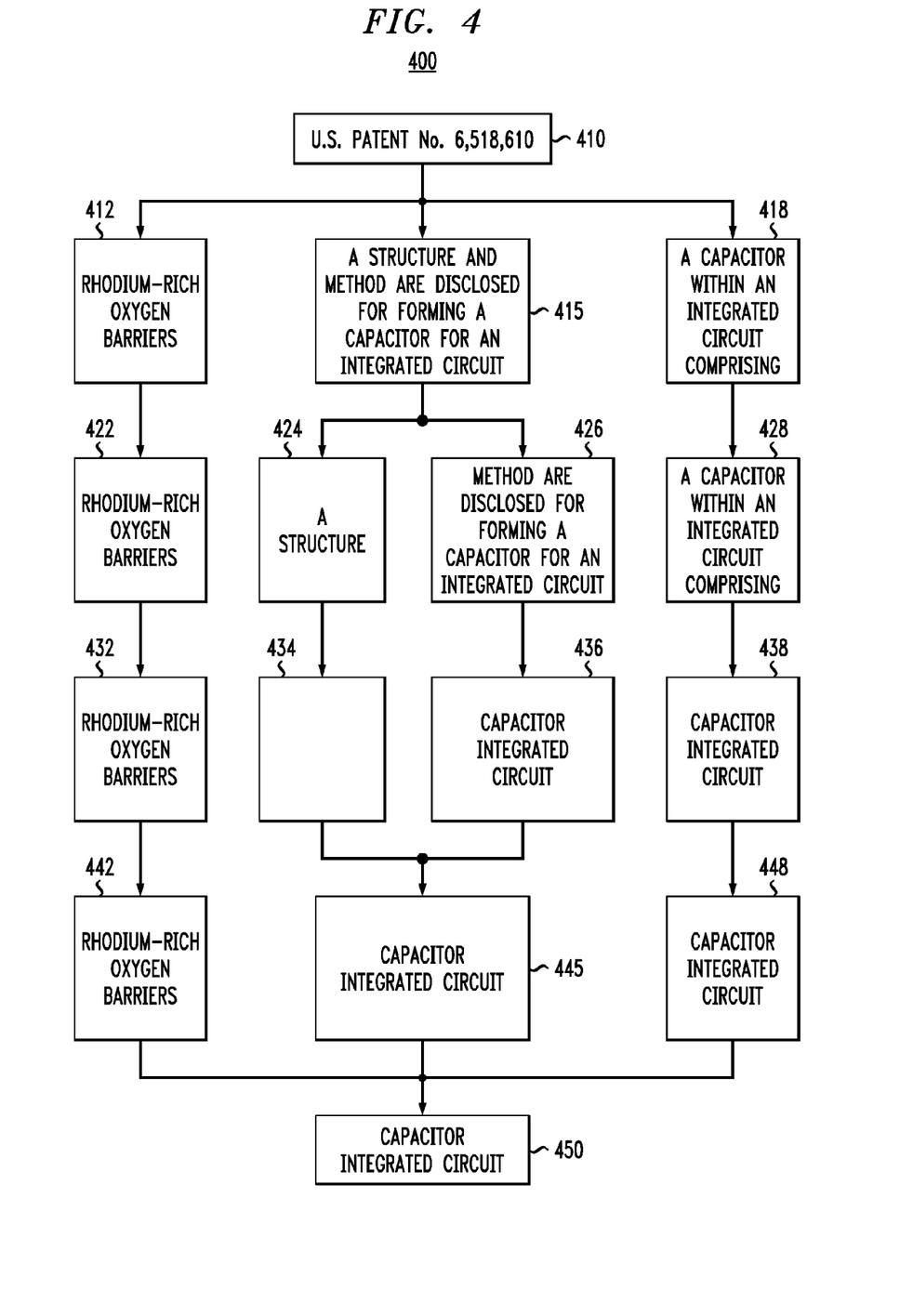
FIG. 4 is a flowchart showing an illustrative embodiment of the method shown in FIG. 3.

FIG. 4 is a flowchart showing an illustrative embodiment 400 of the method 300 shown in FIG. 3. Specifically, an illustrative embodiment of method 300 is executed on exemplary patent document 410, which in this instance is U.S. Pat. No. 6,518,610. First, in step 310, a plurality of sections of patent 410 are extracted.

In this embodiment, three sections are extracted. The first section, 412, consists of the title of the patent, "Rhodium-rich oxygen barriers." The second section, 415, consists of the first sentence of the abstract of the patent, "a structure and method are disclosed for forming a capacitor for an integrated circuit." The third section, 418, consists of the preamble of independent claim 1, "a capacitor within an integrated circuit comprising."

Next, in step 320, the sections are separated into subsections based on their conjunctive structures. Because sections 412 and 418 do not contain conjunctions, subsections 422 and 428, respectively, are identical to sections 412 and 418. However, section 415 is separated into two subsections. Subsection 424 consists of the terms of section 415 found before the conjunction "and" and subsection 426 consists of the terms of section 415 found after the conjunction "and."

In step 330, a determination is made as to whether any "stop-words" are present within the subsections. Any terms within the subsections designated as "stop-words" are removed from the subsection. Subsection 422 is determined to not contain any "stop-words," so subsection 432 is identical to subsection 422. On the other hand, subsection 424 consists entirely of "stop-words," so subsection 434 is a null subsection with no terms. Subsections 436 and 438 each consist of the terms "capacitor integrated circuit," as the remaining words within each subsection were determined to be "stop-words" and hence removed.

In step 340, the sections are reconstituted. In this illustrative embodiment, the subsections comprising each section are concatenated to reconstitute each section. Because subsections 432 and 434 are each the only subsections into which their respective sections were divided, they remain the same. Null subsection 434 and subsection 436 are concatenated so as to reconstitute section 445.

Finally, in step 350, at least a portion of the sections is aggregated so as to form a feature or other summary of the document. In this embodiment, this aggregation comprises the use of a "voting" function wherein only terms present in a plurality of the sections are aggregated. Thus, only the terms "capacitor integrated circuit," which are present in section 436 and 438, are aggregated to form summary 440, which in this embodiment is a purpose feature. The terms "Rhodium-rich oxygen barriers," which are present only in section 432, are excluded from the summary.

Figure 5:
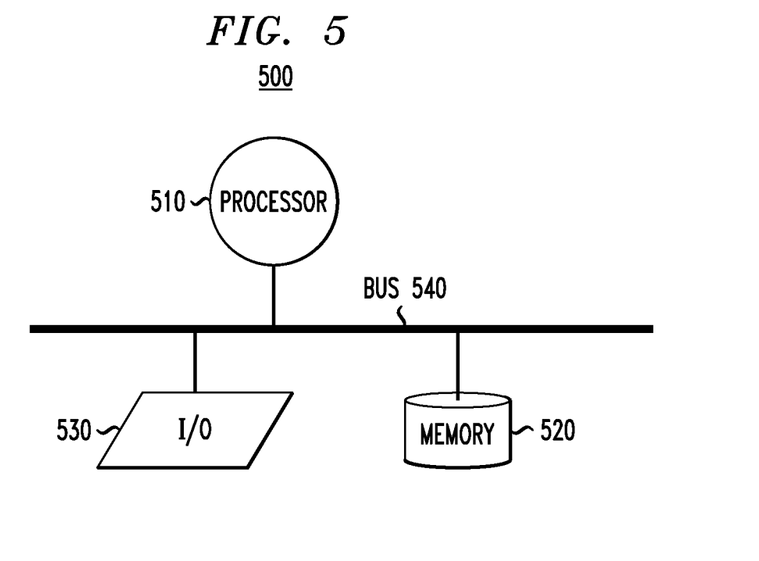
FIG. 5 is a block diagram depicting an exemplary processing system in which inventive techniques may be implemented.

The methodologies of embodiments of the invention may be particularly well-suited for use in an electronic device or alternative system. For example, FIG. 5 is a block diagram depicting an exemplary processing system 500 formed in accordance with an aspect of the invention. System 500 may include a processor 510, memory 520 coupled to the processor (e.g., via a bus 540 or alternative connection means), as well as input/output (I/O) circuitry 530 operative to interface with the processor. The processor 510 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 510. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

TABLE 1 a
accordance
according
all
also
an
and
another
are
as

TABLE 1-continued at
be
because
been
being
by
claim
comprises
corresponding
could
described
desired
do
does
each
embodiment
fig
figs
for
from
further
generally
had
has
have
having
herein
however
if
in
into
invention
is
it
its
means
not
now
of
on
onto
or
other
particularly
preferably
preferred
present
provide
provided
provides
relatively
respectively
said
should
since
some
such
suitable
than
that
the
their
then
there
thereby
therefore
thereof
thereto
these
they
this
those
thus
to
use
various
was
were
what
when TABLE 1-continued where
whereby
wherein
which
while
who
will
with
would

What is claimed is:

1. A method for summarizing a document, comprising the steps of:
   extracting one or more sections of the document;
   separating at least one of the one or more extracted sections into one or more subsections based at least in part on a presence of at least one conjunction within the section, wherein each subsection comprises one or more terms;
   determining whether one or more terms within a designated set of terms are present within at least one of the one or more subsections;
   responsive to a determination that one or more terms within the designated set of terms are present within at least one of the one or more subsections, removing the one or more terms from the one or more subsections; and
   aggregating at least a portion of the one or more subsections into a summary of the document.

2. The method of claim 1, wherein the step of aggregating comprises concatenating at least a portion of the one or more subsections.

3. The method of claim 1, wherein the step of removing one or more terms within a designated set of terms found within at least one of the one or more subsections further comprises removing a portion of the subsection following a term within a given subset of the designated set of terms.

4. The method of claim 1, wherein the step of separating at least one of the one or more extracted sections into one or more subsections comprises:
   determining whether a conjunction is present within a given section; and
   responsive to a determination that a conjunction is present within the given section, separating the given section into one or more subsections wherein each subsection represents a portion of the section terminated by at least one of a conjunction and a punctuation mark.

5. The method of claim 1, wherein a plurality of sections are extracted and wherein the step of aggregating at least a portion of the one or more subsections comprises the steps of:
   reconstituting each of the sections by concatenating the one or more subsections into which each of the sections was separated; and
   aggregating only terms present in at least a plurality of the sections to form the summary.

6. The method of claim 1, further comprising the step of generating a result set comprising the terms present in the summary and, for each term present in the summary, a total number of presences of that term in the summary.

7. The method of claim 1, wherein the summary comprises a purpose feature of the document.

8. The method of claim 7, wherein the document comprises a description of an invention and wherein the purpose feature comprises a purpose of the invention.

9. The method of claim 1, wherein the document comprises at least a portion of a patent document and wherein the step of extracting at least one section of the patent document comprises extracting at least one title section comprising at least a portion of a title of the patent document, at least one abstract section comprising at least a portion of an abstract of the patent document, and at least one claim section comprising at least a portion of at least one claim of the patent document.

10. The method of claim 9, wherein each claim section is a preamble of an independent claim.

11. An article of manufacture for summarizing a document, the article comprising a non-transitory storage medium encoded with one or more software programs that, when executed by a processor, perform the steps of:
   extracting one or more sections of the document;
   separating at least one of the one or more extracted sections into one or more subsections based at least in part on a presence of at least one conjunction within the section, wherein each subsection comprises one or more terms;
   determining whether one or more terms within a designated set of terms are present within at least one of the one or more subsections;
   responsive to a determination that one or more terms within the designated set of terms are present within at least one of the one or more subsections, removing the one or more terms from the one or more subsections; and
   aggregating at least a portion of the one or more sections into a summary of the document.

12. The method of claim 1, further comprising the step of generating a result set comprising the terms present in the summary and, for each term present in the summary, a total number of presences of that term in the document.

13. The method of claim 12, wherein the result set is used for generation of a vector space in which dimensions correspond to vocabulary terms and projection on a dimension corresponds to the number of occurrences in the document.

14. The method of claim 1, wherein the document comprises respective descriptions of (i) a purpose and (ii) details usable for achieving the purpose, and wherein the summary represents the purpose rather than the details.

15. An apparatus for use in summarizing a document, the apparatus comprising:
   a memory; and
   a processor coupled to the memory and operative to perform the operations of:
      extracting one or more sections of the document;
      separating at least one of the one or more extracted sections into one or more subsections based at least in part on a presence of at least one conjunction within the section, wherein each subsection comprises one or more terms;
      determining whether one or more terms within a designated set of terms are present within at least one of the one or more subsections;
      responsive to a determination that one or more terms within the designated set of terms are present within at least one of the one or more subsections, removing the one or more terms from the one or more subsections; and
      aggregating at least a portion of the one or more subsections into a summary of the document.

16. The apparatus of claim 15, wherein the operation of separating at least one of the one or more extracted sections into one or more subsections comprises:
   determining whether a conjunction is present within a given section; and
   responsive to a determination that a conjunction is present within the given section, separating the given section into one or more subsections wherein each subsection represents a portion of the section terminated by at least one of a conjunction and a punctuation mark.

17. The apparatus of claim 15, wherein a plurality of sections are extracted and wherein the operation of aggregating at least a portion of the one or more subsections comprises the steps of:
   reconstituting each of the sections by aggregating the one or more subsections into which each of the sections was separated; and
   aggregating only terms present in at least a plurality of the sections to form the summary.

18. The apparatus of claim 15, wherein the summary comprises a purpose feature of the document.

19. The article of claim 11, wherein the summary comprises a purpose feature of the document.

20. The article of claim 11, wherein the step of separating at least one of the one or more extracted sections into one or more subsections comprises:
   determining whether a conjunction is present within a given section; and
   responsive to a determination that a conjunction is present within the given section, separating the given section into one or more subsections wherein each subsection represents a portion of the section terminated by at least one of a conjunction and a punctuation mark.

21. The article of claim 11, wherein a plurality of sections are extracted and wherein the step of aggregating at least a portion of the one or more subsections comprises the steps of:
   reconstituting each of the sections by aggregating the one or more subsections into which each of the sections was separated; and
   aggregating only terms present in at least a plurality of the sections to form the summary.

* * * * *